United States Patent
Ushiyama

(10) Patent No.: US 7,764,583 B2
(45) Date of Patent: Jul. 27, 2010

(54) INFORMATION RECORDING METHOD AND INFORMATION RECORDING DEVICE

(75) Inventor: Junko Ushiyama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 12/169,121

(22) Filed: Jul. 8, 2008

(65) Prior Publication Data

US 2008/0285426 A1 Nov. 20, 2008

Related U.S. Application Data

(63) Continuation of application No. 11/312,519, filed on Dec. 21, 2005.

(30) Foreign Application Priority Data

Aug. 1, 2005 (JP) .............................. 2005-222329

(51) Int. Cl.
G11B 7/00 (2006.01)
(52) U.S. Cl. ................... 369/59.11; 369/59.12
(58) Field of Classification Search .............. 369/59.11, 369/59.12, 116, 47.5–47.53
See application file for complete search history.

(56) References Cited

U.S. PATENT DOCUMENTS

| | | | |
|---|---|---|---|
| 5,490,126 A | | 2/1996 | Furumiya et al. |
| 6,104,685 A | * | 8/2000 | Saga et al. ............... 369/59.11 |
| 7,139,230 B2 | * | 11/2006 | Shirota et al. ............ 369/59.11 |
| 7,359,301 B2 | * | 4/2008 | Ahn et al. ................ 369/59.11 |
| 2003/0067857 A1 | | 4/2003 | Shirota et al. |
| 2003/0081523 A1 | * | 5/2003 | Miyagawa et al. ....... 369/59.11 |
| 2004/0032808 A1 | | 2/2004 | Ahn et al. |
| 2005/0105438 A1 | | 5/2005 | Hibino et al. |

| | | |
|---|---|---|
| 2007/0133369 A1 | 6/2007 | Horikawa et al. |

FOREIGN PATENT DOCUMENTS

| | | |
|---|---|---|
| CN | 1409310 | 4/2003 |
| CN | 1467729 | 1/2004 |
| JP | 2002-74742 | 3/2002 |
| JP | 2003-85753 | 3/2003 |
| JP | 2003-178448 | 6/2003 |
| JP | 2005-158210 | 6/2005 |
| JP | 2005-530284 | 10/2005 |

(Continued)

OTHER PUBLICATIONS

A. Hirotsune et al., "Write and Read Technology for a 50 GM/Layer at 100 Mbps", pp. 22-23.

(Continued)

*Primary Examiner*—Thang V Tran
(74) *Attorney, Agent, or Firm*—Antonelli, Terry, Stout & Kraus, LLP.

(57) ABSTRACT

An information recording method and device for recording information by irradiating an optical information recording medium with an energy beam includes forming a first recording mark by irradiation of a monopulse-shaped energy beam having at least a first power level and a second power level that is higher than the first power level, and forming a space succeeding the first recording mark with a write strategy having a downward pulse of a third power level that is lower than the first power level on a backside of a midpoint of the space.

3 Claims, 14 Drawing Sheets

FOREIGN PATENT DOCUMENTS

WO      WO 03/107330      12/2003
WO      WO 2005/041175      5/2005

OTHER PUBLICATIONS

Isao Ichimura et al, "Proposal for Multi-Layer Blu-ray Disc Structure", pp. 52-53.

Hidehiko Kando et al., "Adaptive Write Pulse Control for High Density Overwritable GeSbTe Optical Disc", Proceedings of PCOS '99, 25-26, Nov. 1999.

Official Action issued in Japanese Patent Application No. 2005-222329 on Oct. 20, 2009.

Official Action issued in Chinese Patent Application No. 2008101333389 on Feb. 5, 2010.

\* cited by examiner

INFORMATION RECORDING METHOD AND INFORMATION RECORDING DEVICE

CROSS REFERENCE TO RELATED APPLICATION

This application is a continuation application of U.S. application Ser. No. 11/312,519, filed Dec. 21, 2005, the contents of which are incorporated herein by reference.

CLAIM OF PRIORITY

The present application claims priority from Japanese application JP 2005-222329 filed on Aug. 1, 2005, the content of which is hereby incorporated by reference into this application.

FIELD OF THE INVENTION

The present invention relates to an information recording method and an information recording device for recording information by injecting energy into a recording medium and forming a mark different from a non-recording part.

BACKGROUND OF THE INVENTION

In recent years, the capacity of an optical disc increases conspicuously as an information amount to be handled increases. For example, whereas the capacity was 2.6 GB/face in the case of a DVD-RAM of the first generation, as a result of efforts for technology development such as shorter wavelength of a laser to be used and a higher NA of a lens, the capacity of 25 GB/face has been realized in the case of a blue-ray disc. Further, research and development in the technology of increasing an area density in order to record a larger amount of information and the technology of increasing a capacity by the multi-layering of an information face has been advancing. For example, a record reproduction technology for realizing the capacity of 50 GB per face is described in International Symposium on Optical Memory 2004, Technical Digest, Tu-C-02, p22. Further, as an example of the technologies of increasing a capacity by the multi-layering of an information face, a technology for realizing the capacity of 150 GB by stacking six information faces, each of which has the capacity of 25 GB, in layers is described in International Symposium on Optical Memory 2004, Technical Digest, We-E-02, p52. In addition, as an example of discs having a larger capacity, the structure of a multilayered disc having information faces in two or more layers is described in JP-A No. 74742/2002.

With the advancement of the capacity increasing technologies such as the increase of an area density and multi-layering, the research and development of record reproduction technologies is also advancing. As a means of recording information on an optical disc with a high degree of accuracy, there is the adaptive type recording waveform control technology. The adaptive type recording waveform control technology is a method of changing a recording pulse width when a recording mark is formed and is described, for example, on p. 95 of the proceedings of the 11th Symposium on Phase Change Optical Information Storage in 1999. The method is the one wherein information is recorded by increasing or decreasing a recording pulse shape within a length shorter than a clock unit in accordance with the preceding space and/or the succeeding space, and the method makes it possible to suppress to the utmost the edge shift caused by thermal interference in the track direction that is derived from the fact that a recording mark and a space are smaller than a light spot, is very effective in mark edge recording, and exhibits an effect in high area density recording wherein the thermal interference is substantial.

Meanwhile, JP-A No. 63586/2005 (corresponding to US 2005/105438) describes a method of introducing a downward pulse immediately before a recording mark in order to reduce thermal interference generated at the time of high-speed recording. The write strategy of the patent document is shown in FIG. 11A. Further, JP-A No. 295440/1994 (corresponding to U.S. Pat. No. 5,490,126) describes a method of suppressing thermal interference by irradiating the leading and trailing edges of a short space with read power. The write strategy of the patent document is shown in FIG. 11B.

As a recording method conforming to multi-layering, JP-A No. 178448/2003 (corresponding to US 2003/081523) describes the method of recording good signals by using a recording pulse that makes the temperature change of a recording layer caused by the condensation of an optical beam be on the side of rapid cooling in terms of time more in an information recording layer close to the incidence of light than in the information recording layer farthest from the incidence of the light.

SUMMARY OF THE INVENTION

In the above record reproduction technologies, research and development for the precise record on a medium having a single-layered information face has been worked on. In the case of a medium having a single-layered information face, in many cases, a reflective film made of a material having a high thermal conductivity such as aluminum alloy or silver alloy has been formed in the vicinity of a recording layer. As a result, heat generated in a recording film by laser light irradiation diffuses in the disc film thickness direction and thereby the edge shift caused by thermal interference in the track direction has been able to be reduced. However, in the case of recording information on a multi-layered disc having information faces in plural layers, the edge shift caused by the thermal interference in the track direction produces a problem. In the information layer farthest from the incidence of light, it is possible to form a reflective film having a high thermal conductivity in the vicinity of the recording film and hence a thermal diffusion effect of the same level as a disc having a single-layered information layer can be expected. However, since an information layer on the side of the incidence of light is required to have a high permeability, an alloyed reflective film having a film thickness enough to allow a sufficient thermal diffusion effect cannot be formed and as a result the release of the heat in the disc film thickness direction is insufficient. As a consequence, the arising problem here has been that, in the recording on a semitransparent layer, the heat propagates in the recording film plane direction, the temperature rises at the edge of an adjacent mark, and edge shift is caused. The problem has been conspicuous in the case of high-speed recording that uses a monopulse waveform. The monopulse waveform is suitable for high-speed recording wherein the time (Tr and Tf) required for the modulation of laser power cannot be ignored since the frequency of rising and lowering of the laser power is small. However, in comparison with an N-1 system strategy and a 2T system strategy, in the case of the monopulse waveform, a larger amount of energy is applied in a short period of time and hence a bias power cooling effect during the forming of a recording mark, which is seen in the case of a multipulse waveform, cannot be obtained. As a consequence, the arising problem here has been that the thermal interference between the preceding and succeeding marks becomes more conspicuous and edge shift tends to appear. In particular, in the case of high-speed monopulse recording on an information layer having a semitransparent recording layer, the edge shift has been violent.

In order to solve the above problem, the present invention is configured as follows;

(1) When a space is formed after the monopulse that forms a recording mark, a downward pulse is applied on the backside of the midpoint of the space. In the case of an optical disc, in many cases, laser light is used as an energy beam, a multipulse or monopulse waveform is used at a mark portion, and a non-pulse waveform, namely uniform power, is used for irradiation at a space. In the case of a medium wherein heat transfer in the film plane direction is violent, heat generated by the energy irradiation to the space propagates to the trailing edge of the mark recorded immediately before the space and/or the leading edge of the mark recorded immediately after the space. Therefore, in the present invention, in the case of a medium wherein the edge shift of the leading edge of a mark recorded in the next place is conspicuous for example, the effect of heat insulation is secured by: inserting a downward pulse in the back portion of a space near the position of the leading edge; and thereby lowering the average irradiation power of the space below that of the front portion thereof. Thereby, it is possible to reduce the leading edge shift of the succeeding mark.

The edge shift caused by thermal interference is more conspicuous in a short space than in a long space. Therefore, it is effective to insert a downward pulse selectively into the back portion of a space having a prescribed space length where thermal interference is likely to appear. With regard to the prescribed space length, in the case of the recording through 1-7RLL modulation for example, the thermal interference is most conspicuous in a 2T space which is the shortest space and the thermal interference is secondly large in a 3T space, and therefore the above write strategy should be used at least in a 2T space. The energy beam waveform of a monopulse shape according to the present invention means, as shown in FIG. 5, an energy beam waveform wherein the write power (Pw and Pg) when a recording mark is formed is composed of power larger than the intermediate power Ps used for irradiation at the time of space forming.

The effect of inserting a downward pulse on the suppression of edge shift can be obtained also when a multipulse waveform is used as a write strategy. Further, a higher jitter reduction effect is obtained by such a monopulse waveform as represented by the castle shape. In a monopulse waveform, the frequency of the rising and lowering of laser power is low, and hence the monopulse waveform is more suitable for high-speed recording than a multipulse waveform wherein laser power is switched at a high speed. However, since a larger amount of energy is applied in a short period of time, the bias power cooling effect during the forming of a recording mark, which is seen in the case of a multipulse waveform, is not obtained, the recording mark width increases in comparison with the multipulse waveform, the thermal interference between the preceding and succeeding marks becomes more conspicuous, edge shift tends to be caused, and thus more accurate recording control is required in comparison with the case of the multipulse waveform. However, by using a write strategy formed by combining a heat storage type monopulse waveform with a downward pulse, it is possible to suppress the heat transfer between marks and resultantly to obtain good recording characteristics wherein edge shift is small even in high-speed recording.

Further, as shown in JP-A No. 63586/2005, there is the technology of inserting a downward pulse immediately before the front peak power light for the forming of a mark. However, when a downward pulse is applied immediately before, the modulation from the bias power Pb of the lowest power level to the write power Pw of the highest power level is large and the problem arises that the influence of the variation of individual laser is likely to appear at the time of actual installation on a drive. In the present invention, a downward pulse is introduced to the back portion of a space, and thereafter the power level returns to an intermediate power level and then transits to a write power level, and therefore it is possible to reduce the difference of the laser power level at the time of the transition and resultantly to obtain the write stability at drive. Furthermore, the method of irradiating the leading and trailing edges of a short space with read power and thereby suppressing thermal interference as shown in JP-A No. 295440/1994 is suitable for a rewritable phase-change type optical disc wherein the trailing edge position is determined mainly by crystallization characteristics. In the case of a recordable optical disc wherein the trailing edge position is determined by thermal characteristics, it has been found that, when the leading and trailing edges of a short space is irradiated with read power, the introduction of a downward pulse to the leading edge deteriorates the trailing edge jitter of the immediately preceding mark. In contrast, by inserting a downward pulse into only the backside of the center of the space region, it is possible to reduce the leading edge jitter of the immediately succeeding mark without deteriorating the trailing edge jitter of the immediately preceding mark.

FIG. 12 is a schematic view showing the relationship among the width of a downward pulse, the power level thereof, and the leading and trailing jitter (total jitter). When the power level of a downward pulse is increased, a higher jitter reduction effect can be obtained by increasing the pulse width. On the other hand, when the power level is lowered, jitter can be reduced with a narrow pulse width. The insertion of a downward pulse has the effect of shielding heat so that the heat generated by the optical pulse used for irradiation when the immediately preceding mark is formed does not have an effect when the leading edge of the succeeding mark is formed. Hence, the effective applied energy reduction amount which is reduced by the insertion of the downward pulse, namely $(Ps1-Ps2)*W1$ which is the product of the difference between the downward pulse level and the intermediate power $(Ps1-Ps2)$ and the downward pulse width W1 as shown with the shaded area in FIG. 13, is closely related with jitter improvement effect. However, it sometimes happens that, when W1 is too wide or the pulse position is too close to the immediately preceding mark, the trailing edge jitter of the immediately preceding mark increases and resultantly the total jitter increases. Further, another arising problem is that, when W1 is too narrow, it is impossible to produce a pulse waveform stably.

In consideration of such relationship, in the present invention, it is preferable that the width of a downward pulse inserted in a space satisfies the expression $1/16 T \leq W1 \leq 1T$, yet preferably $1/8 T \leq W1 \leq 1/2 T$ (here, the reference character T represents a clock cycle). By inserting a pulse of $1/16 T$ or more in width, the jitter of the leading edge of the mark formed immediately after the space improves. Further yet preferably, by controlling W1 to $1/8 T$ or more, a stable pulse waveform can be obtained in a mass production level taking the variation of a laser driver into consideration. Furthermore, in order to obtain the reduction effect of total jitter including the leading edge jitter and trailing edge jitter, it is desirable to set the downward pulse width W1 at 1T or less. When W1 is wider than 1T, the increased amount of the trailing edge jitter of the immediately preceding mark exceeds the improved amount of the leading edge jitter of the succeeding mark and the improvement effect of the recording characteristics is hardly obtained. In addition, when W1 is in the range of ½T<W1≦1T, whereas the jitter of the leading edge of the succeeding mark is improved, the trailing edge of the immediately preceding mark is influenced in some cases. It is desirable that W1 is ½T or less in order to improve the leading edge jitter of the succeeding mark without increasing the trailing edge jitter of the immediate preceding mark.

The power level Ps2 of the downward pulse inserted in the back portion of a space according to the present invention is controlled in the range of 0.1 mW≦Ps2<Ps1 (here, Ps1 represents the intermediate power used for irradiation when the front half of the space is formed), preferably in the range of 0.1 mW≦Ps2≦Ps1*½. By controlling Ps2 to Ps1*½ or less, it is possible to obtain jitter reduction effect with a narrower pulse width that hardly influences the leading edge of the immediate preceding mark.

In order to reduce the power level and simplify the device structure, it is particularly preferable to make Ps2 coincide with either reproduction light power or a cooling pulse (Pb in FIG. 4) at the time of the forming of a monopulse.

(2) Further, a write strategy according to the present invention exhibits outstanding effect in the recording on an optical information recording medium having information faces in plural layers, in particular in the recording on semitransparent recording layers through which an energy beam is semipermeable. Since a semitransparent recording layer is required to have a high permeability, it is impossible to form an alloyed reflective film having a film thickness enough to exhibit sufficient thermal diffusion effect, resultantly the release of heat in the disc film thickness direction is insufficient, and the heat is likely to propagate in the plane direction. As a consequence, edge shift caused by thermal interference is likely to appear. To cope with the problem, by applying the present invention, it is possible to reduce edge shift and resultantly expand the recording margin.

In general, in the case of a recordable medium, an edge position is mostly determined by temperature distribution after laser irradiation. Hence, when a semitransparent layer is used as a recordable medium, by using a write strategy according to the present invention, it is possible to reduce the edge shift caused by the temperature rise due to thermal interference.

In the case of such multilayer recording, among the faces having information, the energy beam waveform at the time of the recording on a semitransparent information face through which an energy beam is semipermeable is set so as to be different from the energy beam waveform at the time of the recording on the information face farthest from the incidence of a beam. As stated earlier, in the case of multi-layered recording faces, the state of thermal diffusion at the time of recording is very often different between a semitransparent information layer and the information layer farthest from the incidence of light. Therefore, when information is recorded on a semitransparent information layer wherein the thermal diffusion in the plane direction is dominant, as the energy beam waveform used for the irradiation at the time of the forming of a space, a write strategy wherein a downward pulse is inserted in the backside of the center is used. Further, for the information layer farthest from the incidence of light where the thermal diffusion in the film thickness direction is dominant, a non-pulse waveform, namely a write strategy wherein a downward pulse is not inserted, is used along the whole space length. By so doing, it is possible to well record information on all the information layers while edge shift is reduced.

Meanwhile, as shown in JP-A No. 178448/2003, there is a technology of using a recording pulse that makes the temperature change of a recording layer caused by the condensation of an optical beam be on the side of rapid cooling in terms of time more in an information recording layer close to the incidence of light than in the information recording layer farthest from the incidence of the light. However, the technology focuses attention on only a recording pulse at the time of the forming of a mark and does not describe laser irradiation at the time of the forming of a space. The technological means for solution of the present invention is different from that of the above technology in terms of the fact that, in the present invention, a recording pulse is not changed at the time of the forming of a recording mark but the pulse framework is changed at the time of the forming of a space in accordance with each information layer.

As stated above, it is possible to reduce the leading edge shift of a succeeding mark by lowering the average irradiation power of a space below that of the front portion thereof and producing the effect of heat shield.

DETAILED DESCRIPTION OF THE PREFERRED EMBODIMENTS

First Embodiment

An embodiment according to the present invention is hereunder explained in reference to the drawings.

Figure 1:
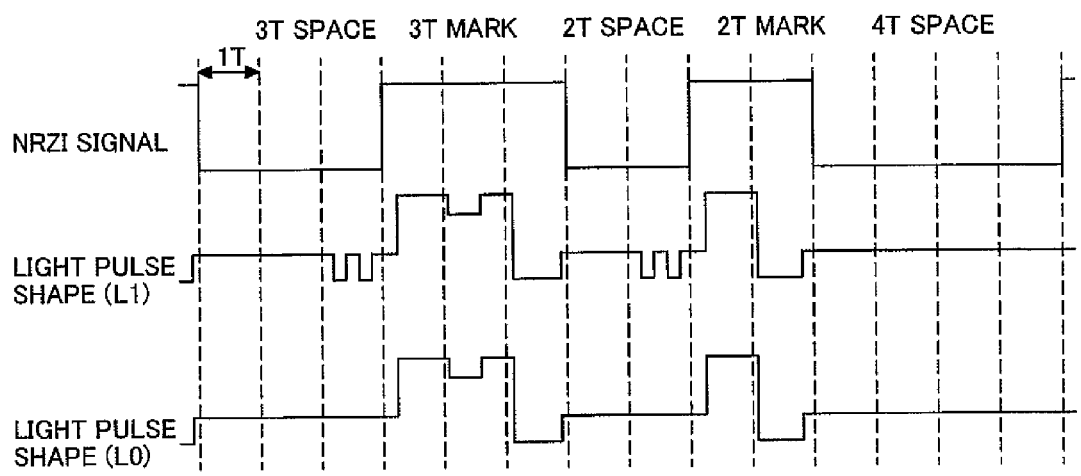
FIG. 1 is a chart showing an example of a recording pulse waveform used in the present invention.

The recording method used in the present embodiment is explained. When data is written on an optical disc, the method of mark edge recording with a multipulse is used and the data is written on the disc as the information of the lengths of a mark and a space. Here, a modulation method wherein both the lengths of a mark and a space are the combination of the integer values in the range from 2T to 9T is used. FIG. 1 shows an example of a write strategy used in the present invention. As shown in FIG. 1, the feature of the write strategy used in the L1 layer recording is that: the laser beam waveform used for irradiation at the time of the forming of a space comprises the power of two levels; and the average irradiation energy at the back portion of the space is different from the average irradiation energy at the front portion of the space. As a result of examining the heat characteristics of a disc used in the present embodiment, the thermal interference tends to occur at 2T and 3T spaces. Hence, each of the optical pulse waveforms used for forming the 2T and 3T spaces is configured so that the average irradiation energy at the back portion of a space is lower than the average irradiation energy at the front portion of the space. To the spaces of 4T or more, non-pulse waveform comprising uniform power is applied.

Figure 6:
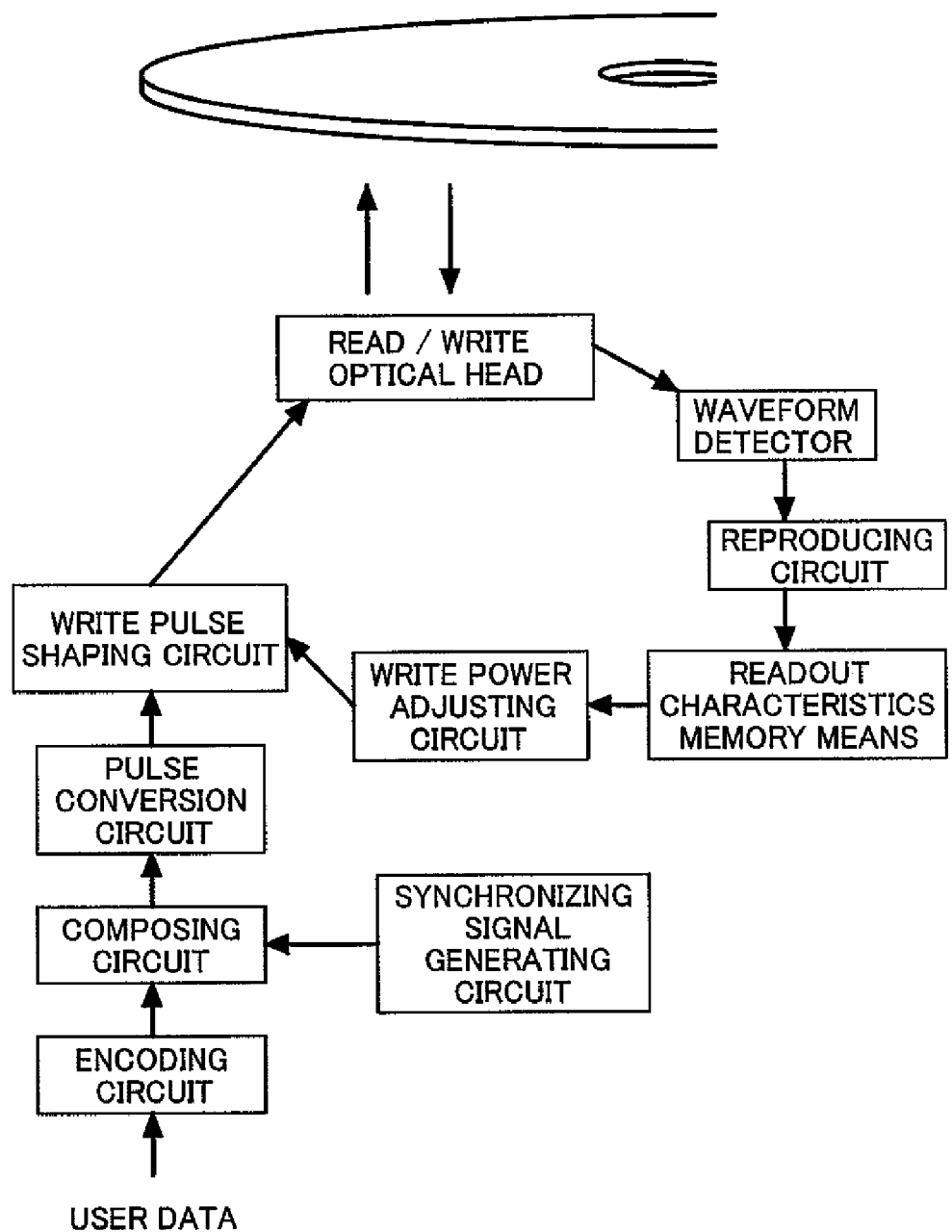
FIG. 6 is a diagram showing an embodiment of the configuration of an optical disc device according to the present invention.

The record reproduction test was carried out by recording data on a blue light source compatible disc A having double information layers with a drive provided with a blue laser 405 nm in wavelength as shown in FIG. 6. The NA of the objective lens was 0.85. The disc used in the present embodiment had recordable type recording layers formed by using phase-change material, and here the information layer on the side of the incidence of light was defined as the L1 layer and the information layer far from the face of the incidence of the light was defined as the L0 layer. The linear velocity at the time of recording was set at 21.12 m/s. in both the cases of the L0 and L1 layers. With regard to the laser power of the L1 layer, the peak power (Pw) was 16.0 mW, the intermediate power (Ps1) 5.0 mW, and the bias power (Pb) 0.5 mW. The laser power Pg intrinsic to a castle type monopulse was set at 11.3 mW and the laser power Ps2 of the downward pulse was set at 0.5 mW which was the same as the bias power. Two downward pulses were applied and the width of each of the downward pulses was set at $2/16$T. With regard to the laser power of the L0 layer, Pw was set at 16.8 mW, Pg 11.3 mW, Ps1 4.6 mW, and both Pb and Ps2 0.5 mW. Random signals were recorded on each of those layers and the signals were reproduced with a limit equalizer. The result showed that the jitter of the L1 layer was 7.5% and the same of the L0 layer was 6.7%. For comparison, the signals were recorded on the L1 layer with an optical pulse waveform for the L0 layer shown in FIG. 1. As a result, the edge shift amount of the leading edge increased and the jitter thereof also increased up to 8.3%.

Figure 2:
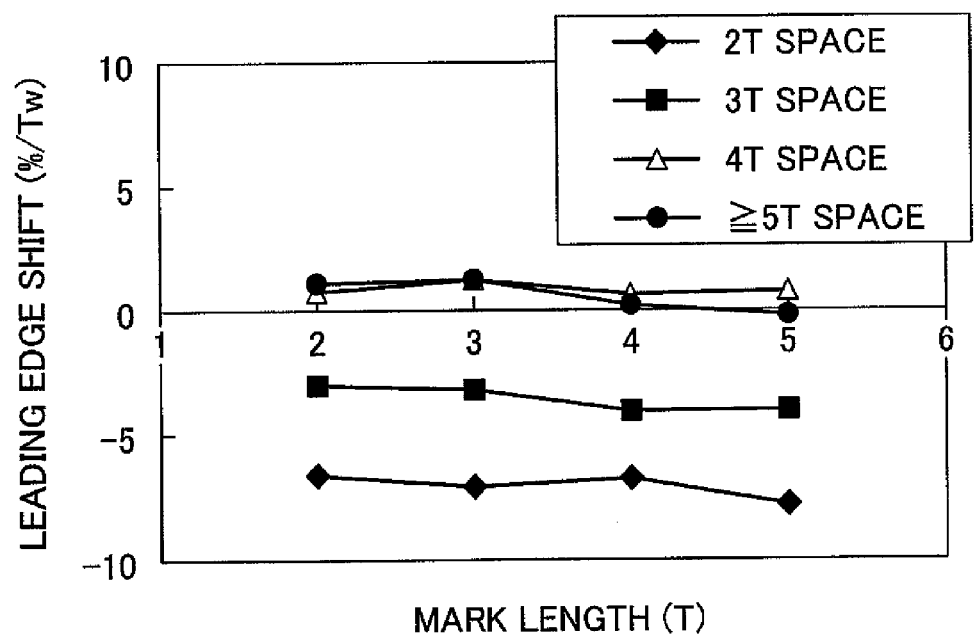
FIG. 2 is a graph showing the relationship among a space, a mark, and a leading edge shift amount in an embodiment according to the present invention.
Figure 3:
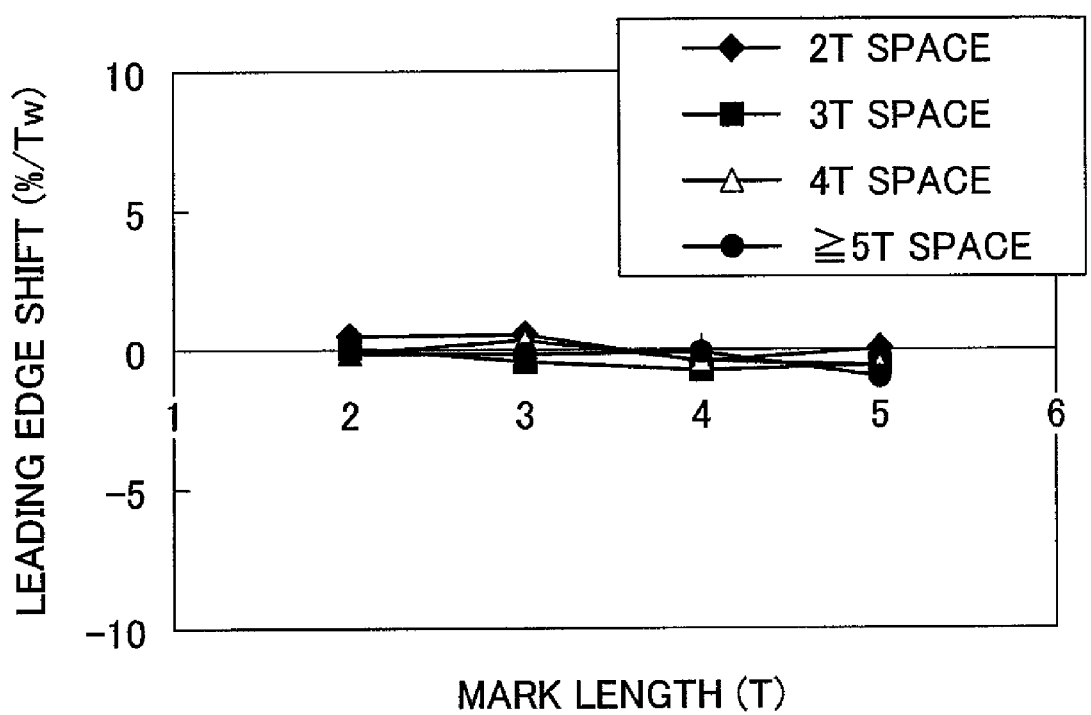
FIG. 3 is a graph showing the relationship between write power and modulation in an embodiment according to the present invention.

The leading edge shift amount of jitter when signals are recorded on the L1 layer with the optical pulse waveform for the L0 layer is shown in FIG. 2 and the same when signals are recorded on the L1 layer with the optical pulse waveform for the L1 layer is shown in FIG. 3. The length of a recording mark succeeding each space is shown on the horizontal axis and the value obtained by standardizing the leading edge shift amount with the window width (Tw) on each condition is shown on the vertical axis. With regard to the plus signs and the minus signs on the vertical axis, the case where a leading edge shifts in the direction of increasing a recording mark is defined as minus and inversely the case where a leading edge shifts in the direction of decreasing a recording mark is defined as plus. For example, it is perceived that the leading edge of the 2T mark succeeding the 2T space shifts by 5%/Tw in the direction of increasing the recording mark.

When signals are recorded on the L1 layer with the write strategy for the L0 layer (FIG. 2), it is understood that, whereas the cases of the 4T and not less than 5T spaces show nearly identical trends and substantial edge shift does not occur in the cases of the not less than 4T spaces, any of the leading edges of the marks succeeding the 2T spaces shifts in the minus direction. Then, the 3T spaces also shift toward the minus side though the shift amount thereof is smaller than that of the 2T spaces. It is estimated that the edge shift dominated by the space length causes jitter to increase. However, as shown in FIG. 3, it has been clarified that, by using a write strategy according to the present invention, the edge shift amount tends to reduce and nearly identical edge shift tends to be obtained without regard to the space length.

As stated above, since edge shift reduces by recording signals using an information write strategy according to the present invention, good recording characteristics can be obtained.

When signals were recorded on the L0 layer with the optical pulse waveform for the L0 layer, namely with the waveform comprising identical power over the whole space length, the jitter was as good as 6.7% as stated above. For comparison, when signals were recorded on the L0 layer with the optical pulse wavelength for the L1 layer, the leading edge shift of the marks formed after 2T and 3T spaces was violent and the jitter deteriorated up to 7.8%. Therefore, it is preferable to use different write strategies between the L0 layer and the L1 layer.

It is preferable to change the number of downward pulses at the back portion of a space in the write strategy for the L1 layer shown in FIG. 1 in accordance with the disc and the drive to be used. The number of the downward pulses may be one and the magnitude of the irradiation energy for forming a space length at the back portion of a space is important. That is to say, as long as the irradiation energy at the back portion is the same, the number of pulses may be one or a pulse may be divided into two or more. Further, a pulse width may be changed in accordance with a space length. By changing a pulse width in accordance with a space length, the advantage that the heat characteristics can be controlled in accordance with the space length is obtained. Further, though downward pulses are inserted in the back portions of the 2T and 3T spaces in the present embodiment, a downward pulse may be inserted in a 4T space in addition to the 2T and 3T spaces in accordance with the heat characteristics of the disc to be used and, if necessary, it is also possible to insert the downward pulses in all the spaces.

Figure 4:
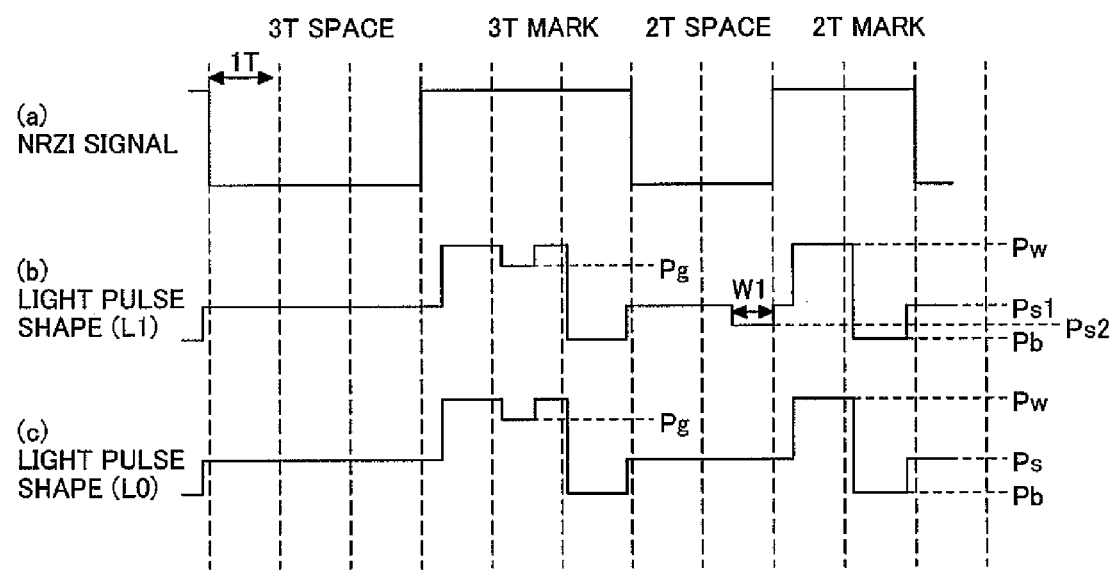
FIG. 4 is a chart showing an example of a recording pulse waveform used in the present invention.

Further, as shown in FIG. 4, even when the laser beam waveform of a space is not a waveform of a multipulse shape but a waveform having power lower than the laser beam power level for forming the space front portion, for example, a waveform of such a beam shape as the 2T space part of the optical pulse shape for the L1 layer shown in FIG. 4, the effect of the present invention is maintained. The important thing is that the average irradiation energy at the back portion of a space is lower than the average irradiation energy at the front portion of the space. Here, Ps2 in FIG. 4 is defined by the expression Pb≦Ps2<Ps1.

Figure 10:
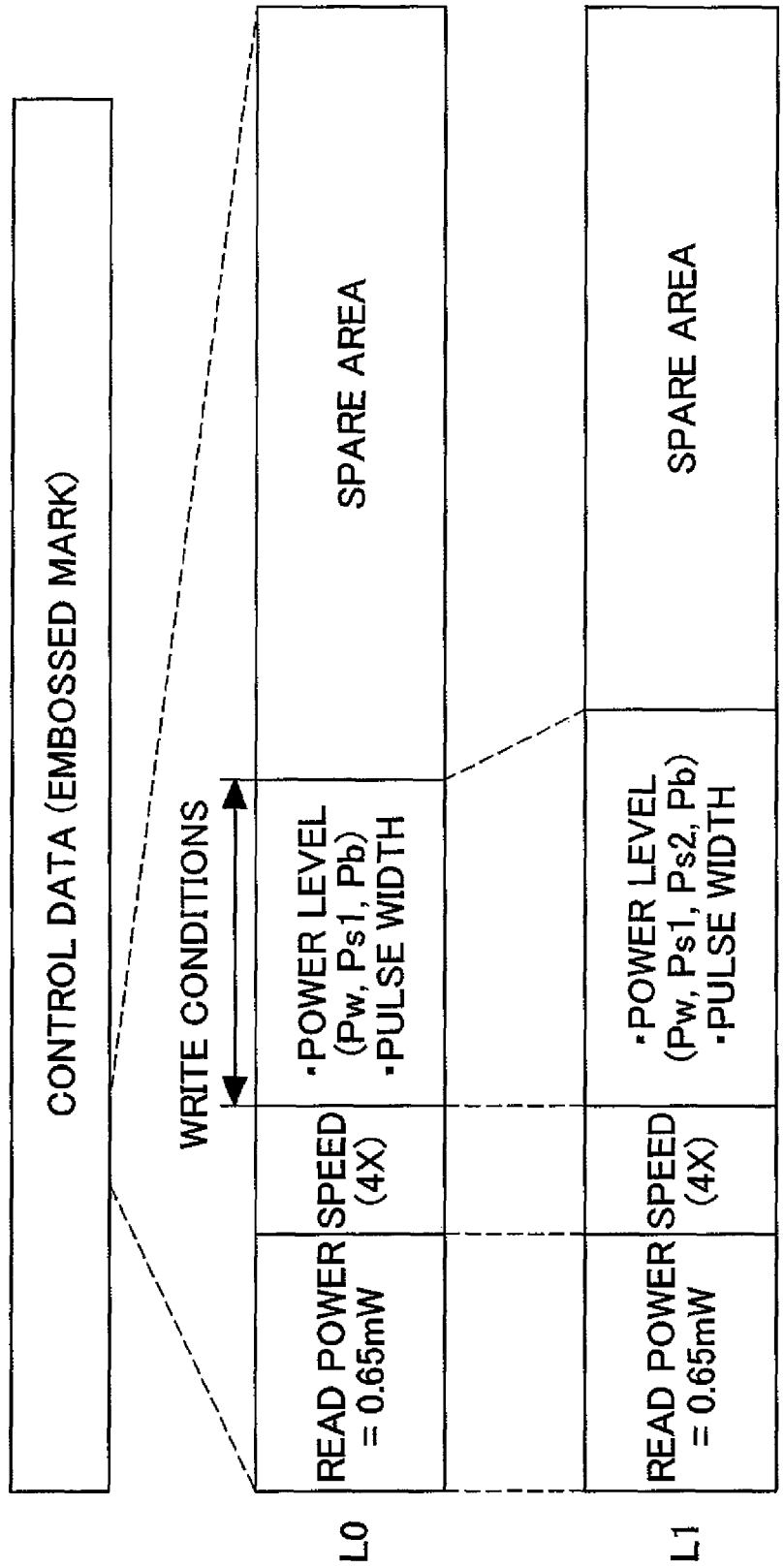
FIG. 10 is an illustration showing a part of the content of data recorded as control data.
Figure 11A:
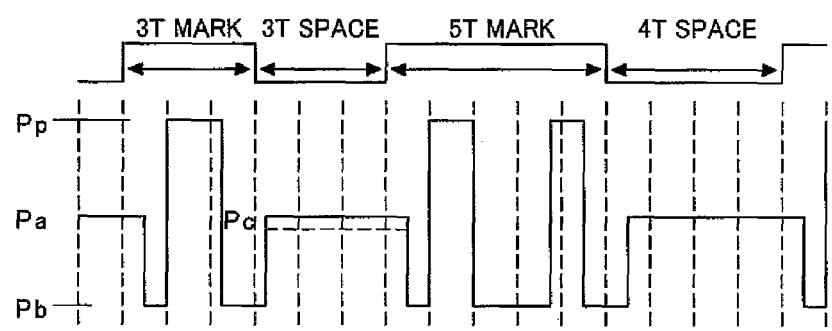
FIGS. 11A and 11B show the write strategies disclosed in JP-A Nos. 63586/2005 and 295440/1994, respectively.
Figure 11B:
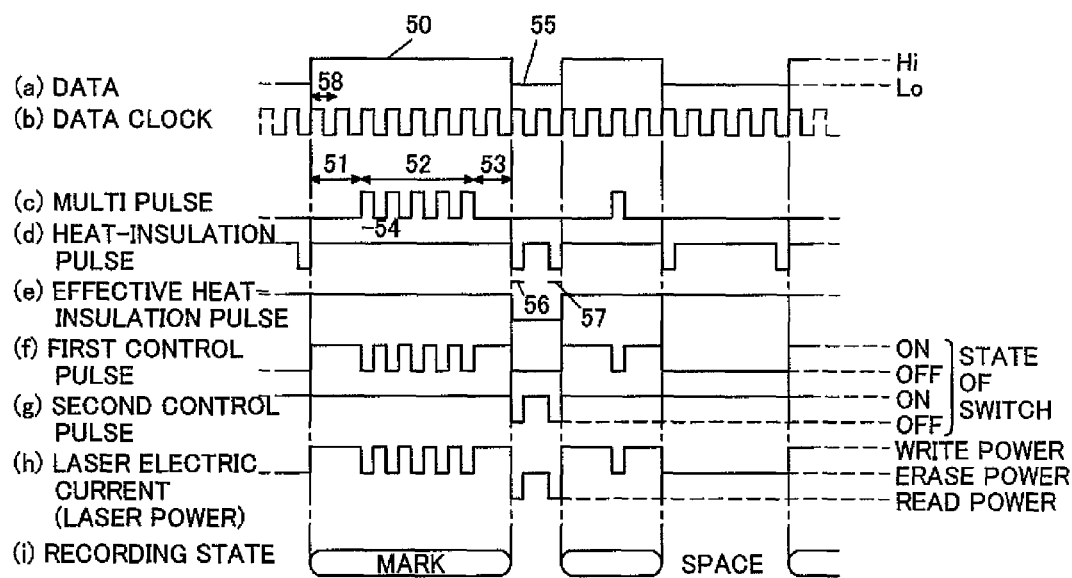
Figure 12:
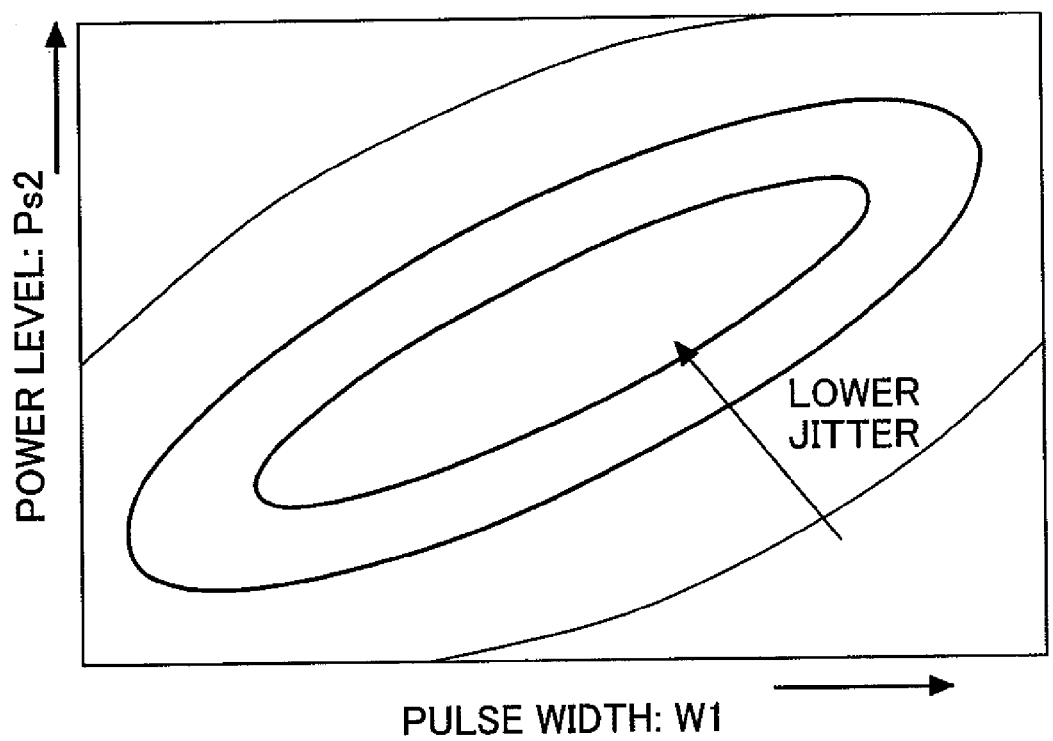
FIG. 12 is an example of a schematic view showing the relationship among the width of a downward pulse, the power level thereof, and total jitter in an embodiment according to the present invention.
Figure 13:
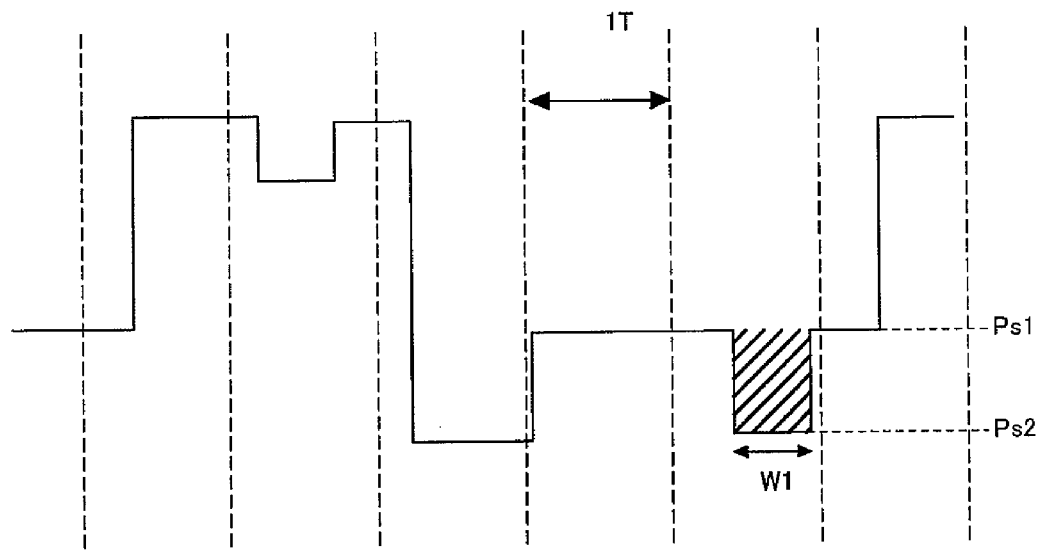
FIG. 13 is a chart showing an example of a recording pulse waveform used in the present invention.

It is preferable that the information on a write strategy, such as the width and power of a downward pulse, is contained beforehand in the control data of a medium. FIG. 10 is a schematic illustration (one example) showing the items contained in the control data zone of a medium. In the control data zone, in addition to the information such as read power, a record reproduction speed, write power, write power such as bias power, and a pulse width, the width of a downward pulse, the power level thereof, and a pulse commencement position (or a pulse termination position) are contained as a recommended waveform. By storing such information beforehand in a medium, it is possible to shorten the test-write time with a drive.

Further, though a disc comprising double information layers is used in the present embodiment, the effect of the present invention is maintained even with a disc comprising three or more information layers. In the case of three or more information layers, it is desirable to use the write strategy used for the L1 layer in the present embodiment for the record on semitransparent information layers.

Though such a castle type monopulse write strategy as shown in FIG. 1 is used in the present embodiment, the effect of the present invention is maintained even when a monopulse waveform comprising one write power level is used.

Further, though a recording medium compatible with a blue laser and a drive equipped with a blue laser are used in the present embodiment, the effect of the present invention is maintained even when the wavelength of a used laser is different like in the case of recording with a red laser.

Second Embodiment

In the present embodiment, a blue light source compatible disc B having an L1 layer the lamination structure of which was different from that of the blue light source compatible disc used in the first embodiment was prepared and random signals were recorded on the L1 layer. The L0 layer had the same lamination structure as the disc A used in the first embodiment and hence the details thereof are omitted here. As shown in (b) of FIG. 4, at the space having the length other than that of the 2T space, a non-pulse waveform having one power level was used and, only at the 2T space, a waveform having two power levels (Ps1 and Ps2) was employed. With regard to the laser power, the peak power (Pw) was 14.0 mW, the intermediate power (Ps1) 3.8 mW, and the bias power (Pb) 0.3 mW. The laser power Ps2 of the downward pulse was set at 0.65 mW, which was the same as the read power. Further, one pulse was set as the downward pulse and the pulse width W1 was set at 4/16T. For comparison, signals were also recorded with the same beam waveform as the write strategy for the L0 layer shown in (c) of FIG. 4, namely a waveform having a non-pulse waveform at the space. As a result, the jitter was 7.3% in the case of using the write strategy for the L1 layer shown in (b) of FIG. 4 and was 8.1% in the case of using the same write strategy as the write strategy for the L0 layer ((c) of FIG. 4). In the case of the L1 layer of the disc used in the present embodiment, the edge shift was conspicuous at the leading edge of the mark after the 2T space and hence the effect of reducing jitter could be obtained.

Figure 7:
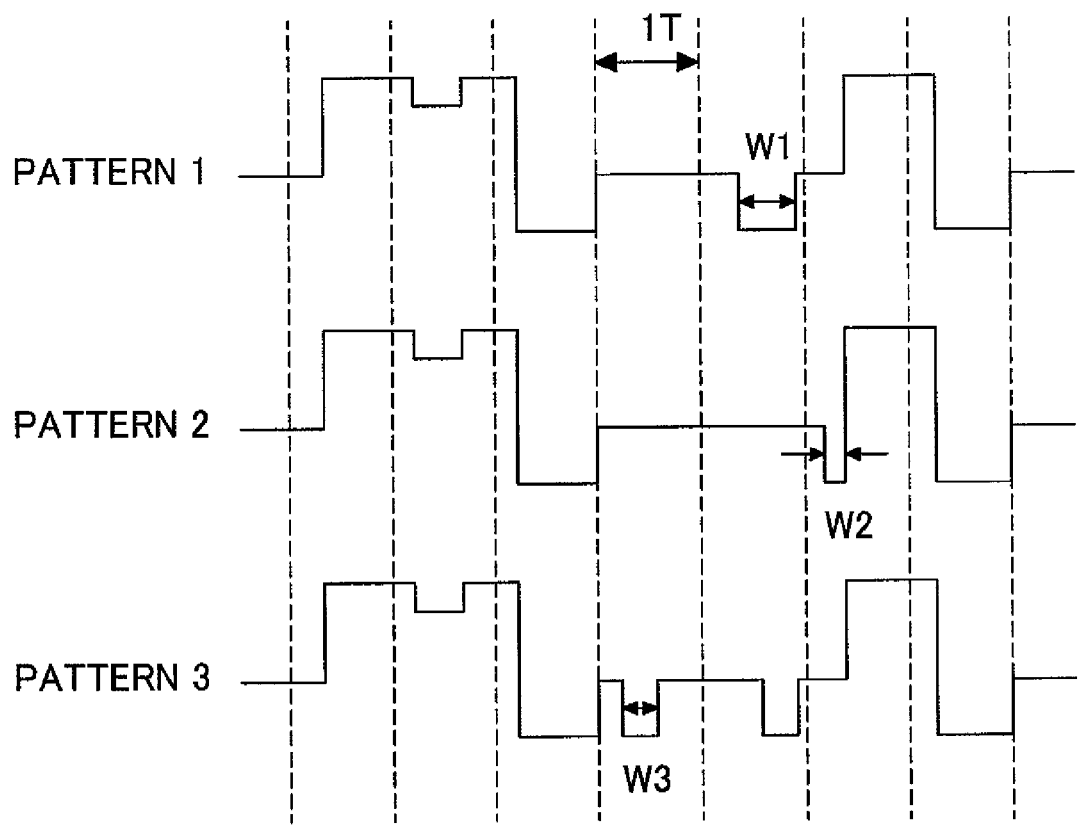
FIG. 7 is a chart showing an example of a recording pulse waveform used in the present invention.
Figure 8:
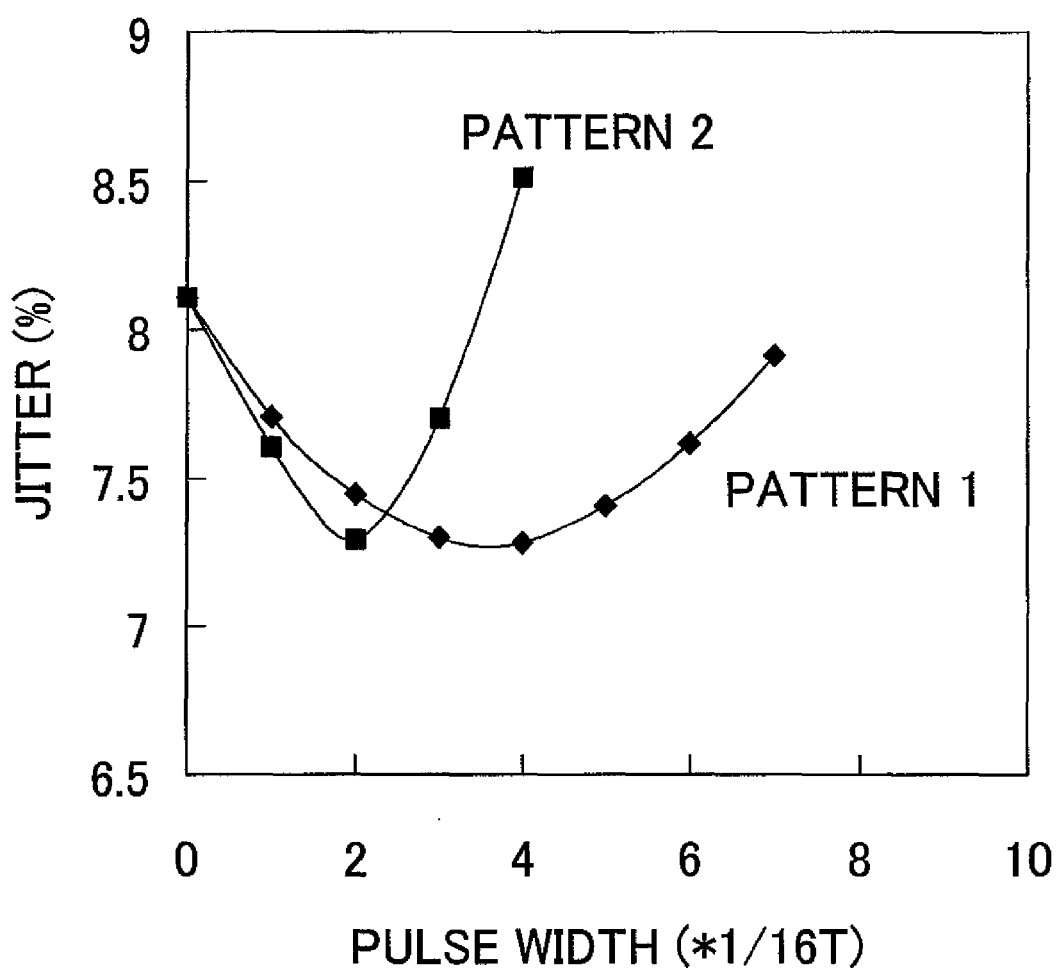
FIG. 8 is a graph showing the relationship between the pulse width of a downward pulse and jitter in an embodiment according to the present invention.
Figure 9:
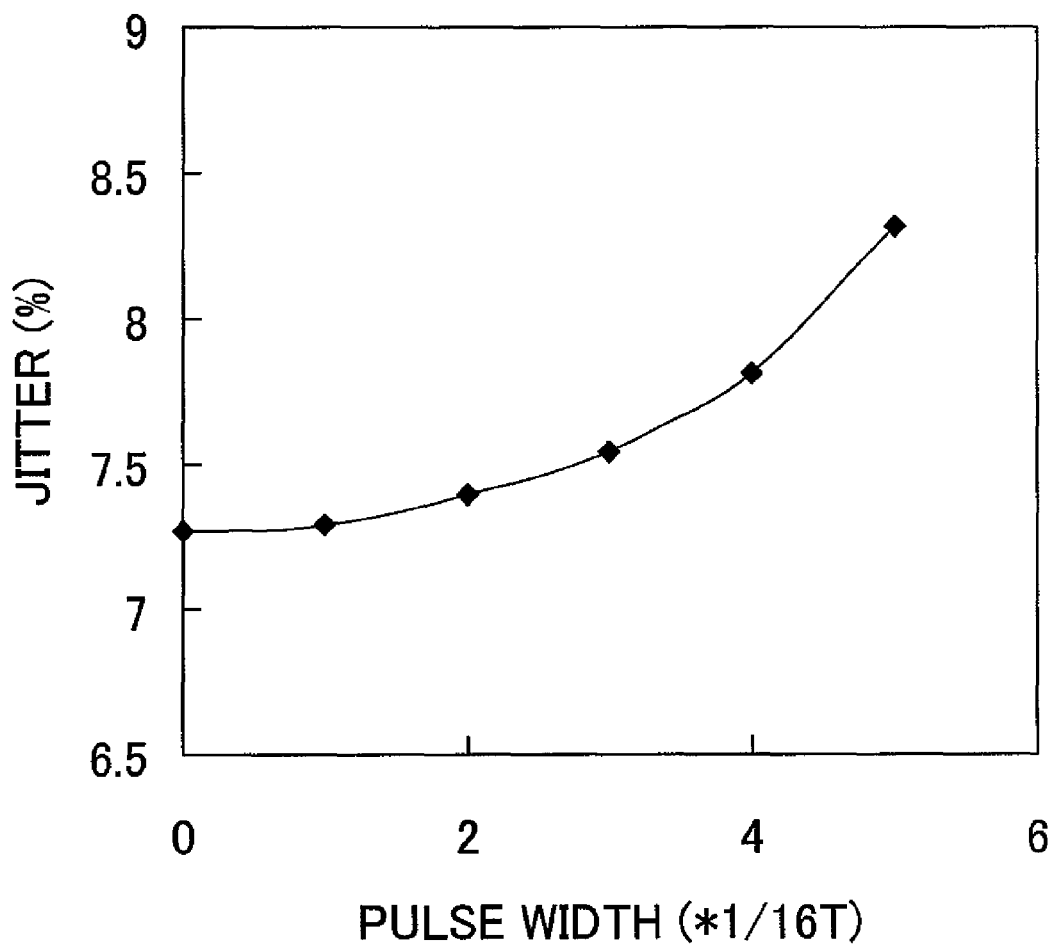
FIG. 9 is a graph showing the relationship between the pulse width of a downward pulse and jitter in an embodiment according to the present invention.

Further, the relationship between the pulse width of a downward pulse and jitter was investigated when signals were recorded with the three write patterns (patterns 1, 2 and 3) shown in FIG. 7. The results are shown in FIGS. 8 and 9. The pattern 1 in FIG. 8 is the write pattern which is one of the examples of the present invention and the pattern 2 is the write pattern wherein a downward pulse is inserted immediately after a 2T space and the downward pulse directly moves to the write power of the succeeding mark (FIG. 7). Aforementioned JP-A No. 63586/2005 belongs to the pattern 2. Here, the pulse width on the horizontal axis in FIG. 8 represents the width of a downward pulse and corresponds to W1 and W2 shown in FIG. 7.

As it is obvious from FIG. 8, the minimum jitter is about 7.3% in both the patters 1 and 2 and the same jitter reduction effect can be obtained. However, the minimum jitter can be obtained only when the optimum pulse width is secured and the drive emits the light of the pulse waveform as previously set. In actual recording with a drive, the pulse waveform of emitted light may be different from intended design (ideal) due to the variation of ambient temperature and the like in some cases. Hence, from the viewpoint of the design of a drive, it is desirable that the variation of jitter is less affected by the variation of a pulse width. If FIG. 8 is examined from the viewpoint, it is understood that, whereas the jitter increases only by 0.1% even when the pulse width varies by ±1/16T from the optimum pulse width (here 4/16T) in the pattern 1, the jitter increases by 0.3% to 0.4% when the pulse width varies by ±1/16T from the optimum pulse width (here 2/16T) in the pattern 2. As a consequence, it is understood that the pattern 1 is more stable against the variation of a pulse width than the pattern 2 and is excellent in the performance stability of a drive. As stated above, from the viewpoint of practicability too, it can be said that the present invention wherein a downward pulse is inserted in the back portion of a space is superior to the write pattern wherein a downward pulse is inserted immediately before a succeeding mark.

FIG. 9 shows dependence on a pulse width in the case of the pattern 3. The pattern 3 represents the write pattern wherein downward pulses are inserted in the front and back portions of a 2T space and aforementioned JP-A No. 295440/1994 is included in the pattern. The horizontal axis in FIG. 9 shows the width of a downward pulse (W3 in FIG. 7) at the front portion of a space and the width of a downward pulse at the back portion of the space is set at a constant. When the pulse width is zero, the same pattern as the write pattern 1 is obtained. As it is obvious from FIG. 9, the jitter increases as the width of a downward pulse at the front portion of a space increases. The increase of the jitter is mainly caused by the increase of the trailing edge jitter and this is because the trailing edge jitter immediately before a 2T space deteriorates due to the insertion of the downward pulse in the front portion of the space. Hence, it is possible to preferably maintain good jitter performance by inserting a downward pulse in the back portion of a space rather than inserting a downward pulse in the front portion of a space and shielding heat.

With regard to a write strategy according to the present invention, it is recommendable that the length of a space to which a write strategy wherein the average irradiation energy is changed between the front and back portions of the space is applied is determined in accordance with the heat characteristics of the semitransparent layer for recording. For that reason, it is preferable to change "a prescribed space length" stipulated in the present invention, which is characterized in that the average irradiation energy at the front and back portions is set so as to be different from each other only in the case of a prescribed space length, in accordance with the type and structure of a disc to be used. Further, in both the present embodiment and the first embodiment, a drive equipped with a blue laser of 405 nm in wavelength and an objective lens of NA 0.85 is used for recording. However, in the present invention, it is preferable to change the shape of a write strategy in accordance with the recording conditions such as the wavelength of a laser used, the NA of the lens used, and others, in the same way as the heat characteristics of a disc.

Third Embodiment

Figure 14:
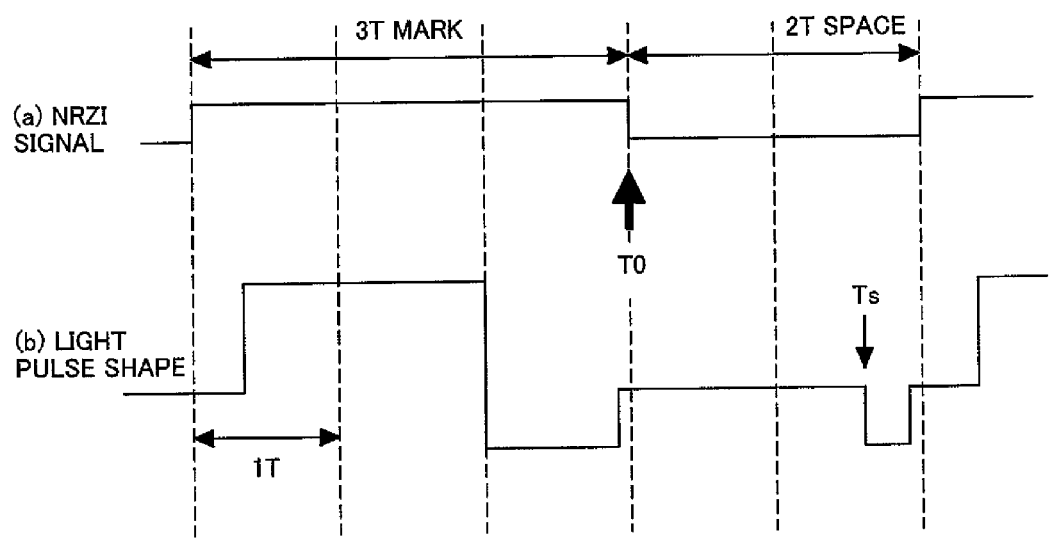
FIG. 14 is a chart showing the relationship between the commencement position of a downward pulse and an NRZI signal in an embodiment according to the present invention.
Figure 15:
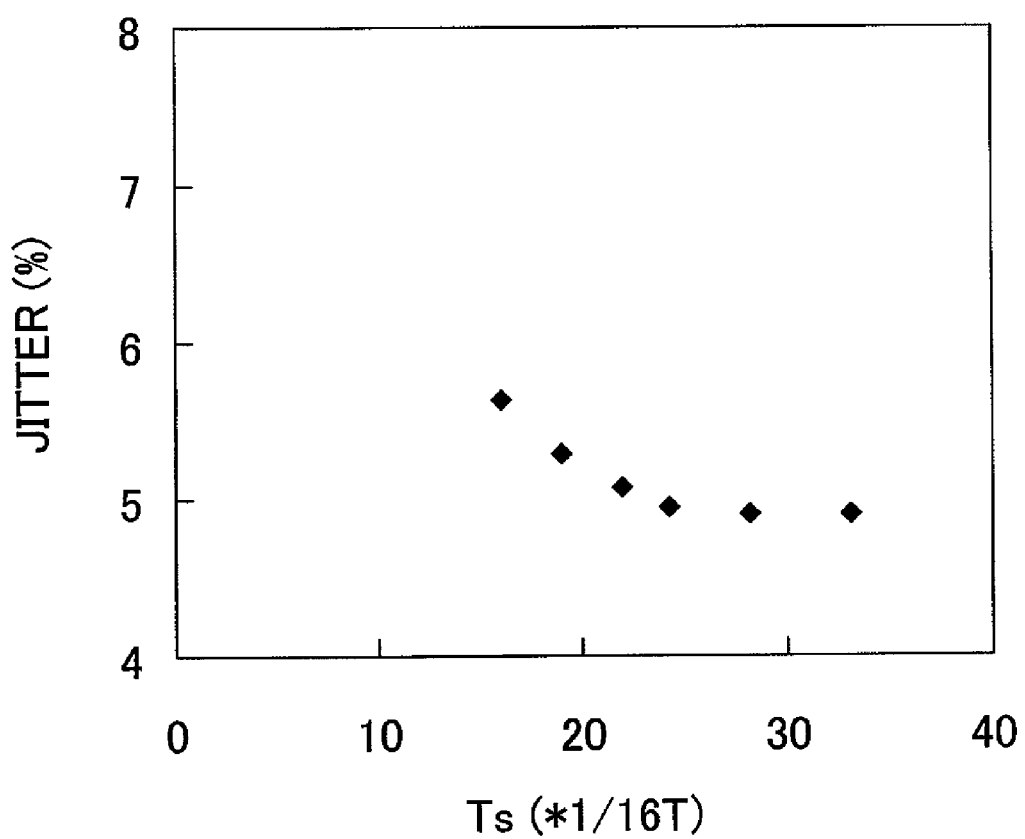
FIG. 15 is a graph showing the relationship between the commencement position of a downward pulse and jitter in an embodiment according to the present invention.

In the present embodiment, record reproduction was carried out using a blue light source compatible disc that had only one recording layer to store information and was capable of 6× recording. The linear velocity was set at 31.7 m/s. and a write waveform comprising 2T to 9T marks was used. The drive used was the same as the one used in the first embodiment. With regard to the laser power, the peak power (Pw) was 18.0 mW, the intermediate power (Ps1) 4.5 mW, the bias power (Pb) 0.1 mW, and the laser power (Ps2) of the downward pulse 0.1 mW, which was the same as the bias power, and the write strategy shown in (b) of FIG. 4 was used. In the present embodiment, the downward pulse was inserted only in the 2T space. One pulse was set as the downward pulse and the pulse width W1 was set at 3/16T. As a result of the record reproduction, the jitter was 4.9% and showed a practically usable good value. Here, the preferable position of the insertion of the downward pulse is a portion of a space on the backside of the midpoint thereof. However, in order to obtain better recording characteristics, a yet preferable position is a position adjacent to the succeeding mark. FIG. 15 shows the change in jitter in the case of changing the position of a downward pulse. W1 is fixed to 3/16T, and the downward pulse commencement position Ts shown in FIG. 14 is shown on the horizontal axis and is expressed by the unit of 1/16T while setting the 2T space commencement position T0 of the (a) NRZI signal shown in FIG. 14 at zero. In FIG. 15, the case where Ts is 16 represents that the downward pulse is inserted so that the midpoint of the 2T space is the downward pulse commencement position Ts and the case where Ts is 33 represents that the downward pulse is inserted most closely to the succeeding mark. From FIG. 15, it has been clarified that, whereas the jitter has almost the same good values when a downward pulse is inserted in a position where Ts is 24 or more on the side of the succeeding mark, the jitter gradually increases when a downward pulse commencement position is set at a position on the front side of the position where Ts is 24. When the downward pulse commencement position Ts is 24, the position is nearly equal to the position of one-third in the latter half of the 2T space. From this fact, it is preferable to insert a downward pulse in a position on the backside of the midpoint of a space, yet preferably in a position between the midpoint and the position of one-third in the latter half of the space.

Fourth Embodiment

Figure 5:
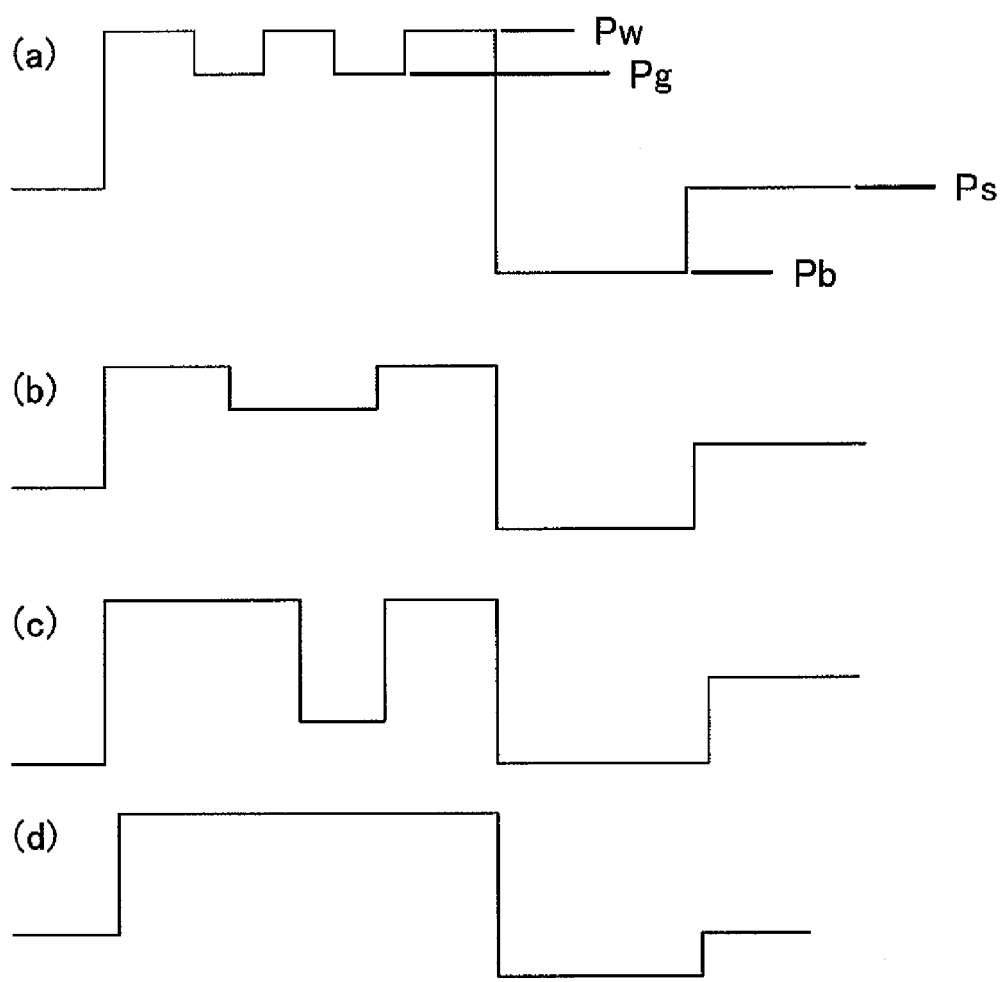
FIG. 5 is a chart showing an example of a recording pulse waveform used in the present invention.

In the present embodiment, a modulation scheme comprising the combination of the integer values of the mark length in the range from 3T to 14T and the space length in the range from 3T to 14T was used. The write strategy comprising one pulse having the power level of Pw as shown in (d) of FIG. 5 was used as the 3T mark, and the write strategy comprising a castle type monopulse waveform having the power levels of Pw and Pg as shown in (b) of FIG. 5 was used as the 4T or more marks.

As the disc, a rewritable DVD capable of 8× recording (red light source compatible phase-change disc) was used and, for the measurement of record reproduction, a drive equipped with a semiconductor laser of 660 nm in wavelength was used. The linear velocity was set at about 27.9 m/s. The clock cycle T was about 4.8 ns. The record reproduction was carried out while applying a downward pulse closely to the succeeding mark under the conditions of Pw of 37.8 mW, Pg of 30.5 mW, the erase power Pe of 6.8 mW, Pb of 0.3 mW, the downward pulse power level Ps2 of 1.0 mW, and the pulse width of 5/16T. As a result, the jitter was 6.5% and the jitter improvement effect of 1.7% was obtained in comparison with the jitter of 8.2% when a downward pulse was not inserted. As stated above, even in a red light compatible disc such as a DVD, it was possible to obtain the jitter improvement effect by inserting a downward pulse in a space.

Fifth Embodiment

Figure 16:
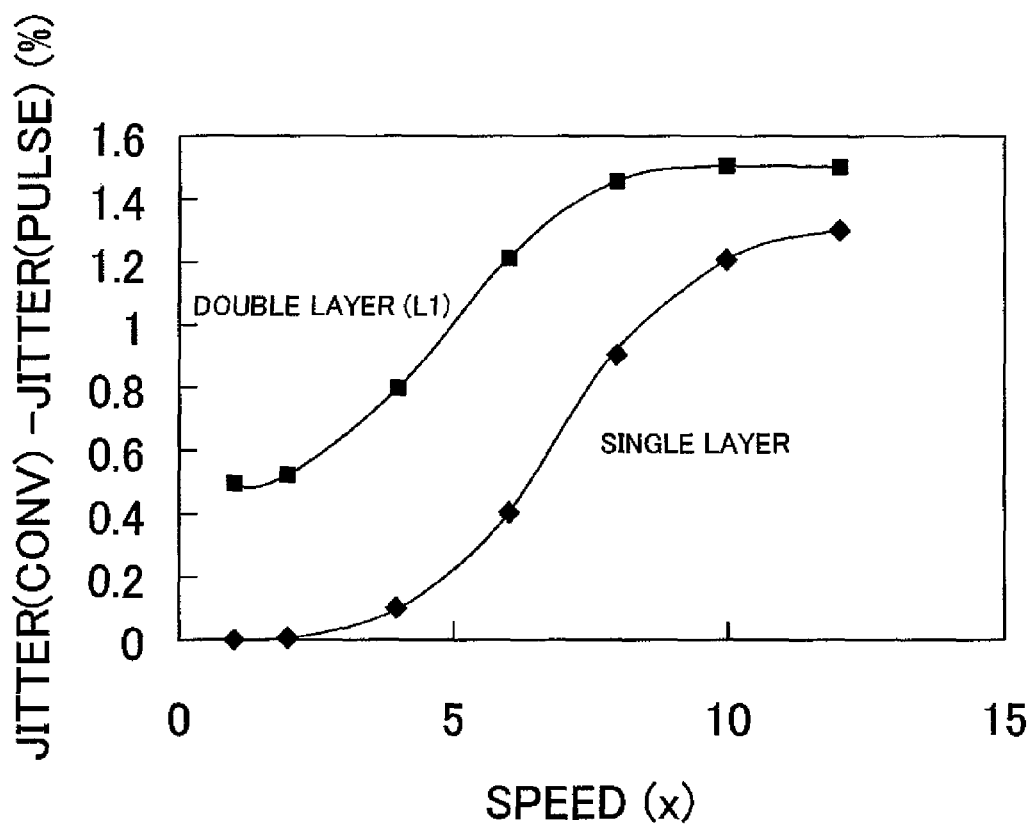
FIG. 16 is a graph showing the relationship between a recording speed and an improvement amount of jitter in an embodiment according to the present invention.

In the present embodiment, dependence on a write linear velocity in the insertion of a downward pulse was investigated. The results are shown in FIG. 16. Two kinds of blue light compatible discs having a single-layered recording film and double-layered recording films respectively were used and the same drive as used in the first embodiment was used. The write strategy was adjusted to the most appropriate waveform by using a downward pulse insertion waveform and a downward pulse non-insertion waveform at each linear velocity. The jitter obtained when record reproduction was carried out with the downward pulse insertion waveform was defined as the jitter (pulse), the jitter obtained when record reproduction was carried out with a conventional write strategy wherein the downward pulse was not inserted was defined as the jitter (conv.), and the difference, jitter (conv.)-jitter (pulse), was shown on the vertical axis in FIG. 16. In the case of the disc having a single-layered recording film, whereas the effect of the downward pulse insertion was not obtained at 1× to 2× speeds, the jitter reduction effect was obtained at 4× speed or higher. The jitter reduction effect was conspicuous at a recording speed exceeding 5× speed. Therefore, in the case of the disc having a single-layered recording film, it is desirable to insert a downward pulse at 6× speed or higher as the downward pulse insertion. In the case of the recording on a semitransparent layer in a disc having plural-layered recording films, the downward pulse showed the improvement effect of 0.5% even at 1× to 2× speeds. Therefore, it is desirable to use a downward pulse at 1× speed or higher in the case of the recording on a semitransparent layer. Further, outstanding improvement of recording performance was seen at a speed exceeding 2× speed. Therefore, it is preferable to carry out the recording on a semitransparent layer with a write strategy wherein a downward pulse is inserted at a speed exceeding 2× speed such as 3× speed or higher.

Though the explanations are given on the basis of a blue light compatible disc here, the similar experiments were carried out also on the basis of a red light compatible disc. As a result, the jitter reduction effect of the downward pulse insertion could be obtained at 8× speed or higher with a DVD and particularly conspicuous effect was obtained at 10× speed or higher. Further, in the case of a multi-layered disc having two or more information layers, the jitter reduction effect was large in the recording on a semitransparent layer through which light permeated and the jitter reduction effect of 1% or more could be obtained at 5× speed or higher.

What is claimed is:

1. An information recording method of recording information by irradiating an optical information recording medium having multilayered recording films with an energy beam, wherein:
when information is recorded on a first recording layer disposed on the side of the incidence of said energy beam, said information recording method comprises the processes of, forming a first recording mark by the irradiation of a monopulse-shaped energy beam having at least a first power level and a second power level that is higher than said first power level, forming a space succeeding said first recording mark with a write strategy having a downward pulse of a third power level that is lower than said first power level only on the backside of the midpoint of said space, a falling edge and a rising edge of said downward pulse being on the backside of said midpoint, and thereafter forming a second recording mark by raising said third power level to said first power level and maintaining said first power level, and raising again said first power level to said second power level and maintaining said second power level; and when information is recorded on a second recording layer farthest from the side of the incidence of said energy beam, a write strategy different from said write strategy is used.

2. An information recording method according to claim 1, wherein a non-pulse waveform is used when a space is recorded on said second recording layer.

3. An information recording method according to claim 1, wherein the recording speed at which said information is recorded is 3× speed or higher.

* * * * *